US005849447A

United States Patent [19]

Matsuda

[11] Patent Number: 5,849,447

[45] Date of Patent: Dec. 15, 1998

[54] RECORDING PAPER AND RECORDING METHOD USING THE SAME

[75] Inventor: Tsukasa Matsuda, Ashigarakami-gun, Japan

[73] Assignee: Fuji Xerox Co., Ltd., Tokyo, Japan

[21] Appl. No.: 732,978

[22] Filed: Oct. 16, 1996

[30] Foreign Application Priority Data

Dec. 18, 1995 [JP] Japan .................................... 7-329319

[51] Int. Cl.[6] .............................. D21F 11/00; B32B 5/08; G03G 13/16

[52] U.S. Cl. ............................. 430/97; 162/146; 428/207

[58] Field of Search ............................... 430/97; 428/207; 162/146

[56] References Cited

U.S. PATENT DOCUMENTS

| | | | |
|---|---|---|---|
| 3,922,463 | 11/1975 | Masaoka et al. | 428/323 |
| 3,963,821 | 6/1976 | Takeda et al. | 264/147 |
| 4,015,043 | 3/1977 | Watanabe et al. | 428/342 |
| 4,064,304 | 12/1977 | Fujita et al. | 162/146 |
| 4,152,317 | 5/1979 | Agouri | 162/146 |
| 4,210,487 | 7/1980 | Driscoll | 162/146 |
| 4,347,104 | 8/1982 | Dressler | 162/103 |
| 4,442,172 | 4/1984 | Oshima et al. | 428/342 |
| 5,541,002 | 7/1996 | Hosoi et al. | 428/537.5 |

FOREIGN PATENT DOCUMENTS

| | | |
|---|---|---|
| A-58-72495 | 4/1983 | Japan . |
| A-59-35977 | 1/1984 | Japan . |
| A-62-178383 | 8/1987 | Japan . |
| A-2-16079 | 1/1990 | Japan . |
| A-3-161760 | 7/1991 | Japan . |
| 3-180599 | 8/1991 | Japan . |
| A-5-177921 | 7/1993 | Japan . |
| A-5-221113 | 8/1993 | Japan . |
| A-5-341553 | 12/1993 | Japan . |
| A-6-11880 | 1/1994 | Japan . |
| A-6-92007 | 4/1994 | Japan . |
| A-6-99655 | 4/1994 | Japan . |
| A-7-125405 | 5/1995 | Japan . |
| A-7-125414 | 5/1995 | Japan . |
| A-7-125417 | 5/1995 | Japan . |
| 7-186519 | 7/1995 | Japan . |
| A-7-237366 | 9/1995 | Japan . |

OTHER PUBLICATIONS

"*Pulp and Paper Chemistry and Chemical Technology*", Third Edition, vol. 2, Feb. 1984, Edited by James P. Casey, pp. 226–236.

*Primary Examiner*—John Goodrow
*Attorney, Agent, or Firm*—Oliff & Berridge, PLC

[57] ABSTRACT

Recording paper, at least one of opposite surface portions contains a mixture of hydrophilic fibers and hydrophobic fiber as main raw material. In addition, recording paper having a double-layer structure, in which a first layer 31 contains a mixture of hydrophilic fibers and hydrophobic fibers as main raw material, and a second layer 32 is a layer different from the first layer. The recording paper may have three or more layers including the first layer. Recording is performed by using such recording paper.

30 Claims, 7 Drawing Sheets

RECORDING PAPER AND RECORDING METHOD USING THE SAME

BACKGROUND OF THE INVENTION

The present invention relates to recording paper for use in various recording methods, such as a full-color or monochrome recording method with a water-based liquid, a full-color or monochrome recording method in an electrophotographic system using a copying machine or a printer, etc., and relates to a recording method using this recording paper.

Conventionally, various recording methods have been known. There have been known, for example, an ink jet recording method in which a liquid with dye or pigment dissolved or dispersed as a coloring agent in a solvent chiefly containing water is injected onto paper in accordance with electric signals to form a visible image; and a recording method using an electrophotographic system, specifically a dry electrophotographic recording method or a wet electrophotographic recording method in which electrostatic latent images formed on a photoconductive photosensitive body are made visible by dry development or wet development, and these visible images are transferred and fixed on paper by electrostatic force, pressure or heat.

There are some problems even in such recording methods. For example, in a wet electrophotographic recording method, an insulating hydrocarbon system is generally used as a solvent to be a carrier of toner in a developer used for wet development, but there is a serious problem in safety caused by the generation of hydrocarbon steam. Therefore, a recording method for forming an image on paper with a developer or ink in which dye, pigment or coloring particles are dispersed or dissolved in a solvent chiefly containing water has been considered other than an ink jet recording method. In this way, a recording system is expected to have more and more variety in the future.

Conventionally, in such a recording system, economical recording paper for obtaining the best quality of images without losing the reliability of a recording apparatus has been required and this requirement will be continued in the future. Therefore, recording paper is required to overcome various problems.

In recording paper used in a recording system using a water-based liquid, it is regarded as a main problem to prevent a line quality failure (bleeding, or a sharpness failure), color mixture bleeding, and a coloring failure (low color saturation). For example, in special paper used in an ink jet recording system, porous white pigment is applied to a paper surface to increase the absorption of ink, so as to overcome the foregoing problem, as typically disclosed in Japanese Patent Unexamined Publication No. 59-35977 Japanese Patent Unexamined Publication No. Hei-2-16079. However, any recording paper of the non-coating type which can improve the above-mentioned problem satisfactorily has not been disclosed.

In recording paper used for dry electrophotographic recording, it is regarded as main problems to prevent line quality failures, image mottles caused by deterioration in transferring efficiency or thermal efficiency, granularity failures (sense of roughness of an image), and curl. To solve such problems, for example, with respect to transfer paper of a dry electrophotographic recording system, there is a proposal to improve the smoothness of the surface by calendering treatment or by use of fine wood fibers in a surface layer to thereby improve the quality of images or avoid troubles in fixing toner, as disclosed in Japanese Patent Unexamined Publication Nos. Hei-6-11880, Hei-5-341553, Hei-3-161760, and Hei-3-180599. This smoothing treatment has some effect in improving the efficiency in transferring and fixing the toner. However, there is a limit in the improvement of the efficiency. In addition, other defects cannot be overcome satisfactorily.

In recording paper for use in heat transfer recording, it is regarded as problems to prevent line failures, image mottles, and granularity failures. To solve such problems, for example, as disclosed in Japanese Patent Unexamined Publication No. Hei-7-237366, etc., there is a proposal to provide a very smooth coated layer having even and minute voids in at least one surface side to thereby improve the absorption and clarity of ink. However, because of using paint, a so-called general-paper property is lost, or there is a limit in writing property. Accordingly, the paper does not have enough aptitude for recording with water-based ink or the like.

In addition, recording paper which can be used in common for various recording systems is expected, but there are many problems also in this expectation.

For example, in a recording method in which a water-based developer is used, or in a recording method in which water-based ink is transferred onto paper, if conventional electrophotographic transfer paper which has been used in conventional indirect dry electrophotographic copying machines and printers is used, it is difficult to avoid problems such as bleeding of images along fibers, coloring failures, inter-color bleeding, color mixture, resolution failures, and so on.

In addition, if conventional ink jet special paper is used in dry electrophotographic full color copying machines or printers, there are such various problems that the fixation strength of a toner image onto paper is weak because of a white paint layer or the like applied to the paper surface, that images are disordered at the time of electrostatic transfer of toner onto paper because the paper surface resistance and the paper volume resistance are not adjusted, that curl or irregularity generated at the time of heating and fixing of toner is conspicuous because application of heat is not taken into consideration in the ink jet special paper, and so on.

Further, particularly in the case where conventional dry electrophotographic transfer paper is used in a full-color indirect dry electrophotographic recording apparatus, there is such a problem that the sharpness at edge portions of a line image is deteriorated, or granularity is deteriorated (that is, roughness is shown) in many half-tone areas existing in an electrophotographic image or the like, and low frequency mottles (that is, mottles which are low in spatial frequency) is conspicuous both in a high image density portion and a low image density portion.

Recording paper of the non-coated paper type which can be used in common in an ink jet recording system and a dry electrophotographic recording system is disclosed in Japanese Patent Unexamined Publication Nos. Hei-7-125405, Hei-7-125414, Hei-7-125417, etc., where improvement of dot shapes, prevention of discoloration of images, and improvement of water resistance are intended by use of general paper treated with a substance for absorbing ammonium ions, or general paper treated with penetration retardant. However, these publications teach nothing about color ink aptitude such as color bleeding between color inks or the like, about improvement of full color dry electrophotographic images, and so on. In addition, although improvement of image quality by the device of various surface treatments, internally-additive sizing agents, and loading materials is proposed in Japanese Patent Unexamined Publication Nos. Hei-5-177921, Hei-5-221113, Hei-6-92007, and Hei-6-99655, the proposals are not sufficient about color ink aptitude, above-mentioned improvement of full color dry electrophotographic images, and so on.

SUMMARY OF THE INVENTION

The present invention has been achieved to overcome the foregoing defects possessed by the conventional recording paper, and it is an object thereof to provide recording paper which can overcome the defects of various recording systems, and hence which can be used in various recording systems in common.

Specifically, it is an object of the present invention to provide recording paper in which line images are sharp and have no image bleeding along fibers, and which is superior in coloring property, resolution and inter-color bleeding, in a recording system using a water-based liquid including dye, pigment, or coloring fine particles.

It is another object of the present invention to provide recording paper which is superior in image quality such that sharpness of line images is superior, granularity in half-tone areas of images is superior, there is no mottle from high image density portions to low image density portions, and so on, and such that there is less deformation such as curl, roughness and so on, in a dry electrophotographic system, particularly even in the case of recording in a full color copying machine or printer of such a system.

It is a further object of the present invention to provide recording paper which can prevent line quality failures, image mottles, and granularity failures in a heat transfer recording system.

It is a still further object of the present invention to provide a recording method which can solve the foregoing problems.

The present invention has succeeded in solving the foregoing problems in various recording methods such as a recording method using a water-based liquid including dye, pigment, or coloring fine particles, a recording method of the dry electrophotographic system, etc., by making a mixture of hydrophilic fibers and hydrophobic fibers be contained in the paper surface.

That is, in the recording paper according to the present invention, at least one of the opposite surface portions contains a mixture of hydrophilic fibers and hydrophobic fibers as its main raw material.

The above-mentioned term "main raw material" is used to allow desired additives other than hydrophilic fibers and hydrophobic fibers to be included in accordance with user's will so long as recording paper according to the present invention can exhibits functions and effects which will be made clear later. Therefore, it is a matter of course that recording paper which does not have any of such additives is included in the present invention.

Moreover, the present invention relates to recording paper having a double-layer structure, wherein a first layer contains a mixture of hydrophilic fibers and hydrophobic fibers as main raw material, and a second layer is different from the first layer; or recording paper including three or more layers, wherein at least one of outermost surface layers of the layers contains a mixture hydrophilic fibers and hydrophobic fibers as main raw material, and other layers are different from adjacent layers.

The recording method according to the present invention is a method for forming images on such recording paper with coloring material containing dye, pigment or coloring fine particles; powder toner; or hot-melt ink containing coloring fine particles.

DETAILED DESCRIPTION OF PREFERRED EMBODIMENTS

Figure 1:
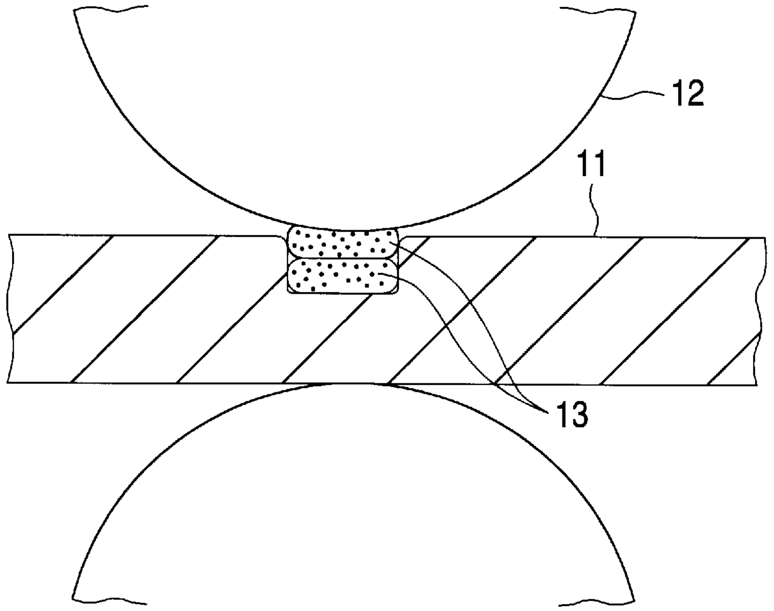
FIG. 1 is a typical view in the case where images are formed on recording paper according to the present invention.

The present invention will be described hereunder while referring to the circumstances to its completion.

To solve the foregoing problems, the present inventor first observed carefully the quality of an image when the image was formed on conventional electrophotographic transfer paper with a water-based liquid in which dye was dissolved. In the image formed with the water-based liquid, an uneven image flow along fibers was produced on the paper surface, and the image was dispersed relative to the position where the image had to be formed on the paper. In addition, when the section of the paper was confirmed, the penetration state was uneven, and through finer observation, it was confirmed that the water-based liquid flowed into fiber walls of coarse voids generated between fibers of the paper, and that the penetration of the water-based liquid concentrated in the portion where fibers were condensed. It is considered that the concentration of the penetration was influenced by hydroxyl groups most of which existed in the portion where fibers were condensed. In addition, image bleeding caused by the phenomenon of overflow of the water-based liquid, and mottles caused by color mixture were observed in the portion where a secondary colored image was formed with water-based liquids of respective colors or in the boundary portion of different colors, and further an image flow along fibers was conspicuous. That is, it was found that cellulose fibers which were a main constituent unit of paper was so strong in affinity to a water-based liquid that the image was changed by the structure of the fibers.

Secondly, the present inventor examined deeply the reason why sharpness failures of line images, deterioration of granularity (sense of roughness of images) in half-tone areas, mottles from a high image density portion to a low image density portion were produced in the case where conventional electrophotographic transfer paper was used in full color dry electrophotographic recording of the digital system. In the full color dry electrophotographic recording, to transfer a toner development image to paper, there have been known a method of sequentially transferring respective colors electrostatically, or electrostatically under pressure, and a method of primarily transferring a development image on a photosensitive body to an intermediate transfer body once, and secondarily transferring the primary transferred image to paper electrostatically, or electrostatically under pressure. Further, there is also a method where heat is given in transferring to the paper to thereby perform transfer and fixation simultaneously. In any method, when a transferred image is fixed to paper, toner is melted and fixed by heat of a roll, a belt, an oven, or the like. The present inventor paid attention to the structure of images and the quality thereof on paper in these image forming methods, and examined them. The inventor found that intermittence of line images or dotted images as a basic image structure, and a flow of images along in transferring and fixing were produced by coarse voids existing irregularly in the paper surface layer and fibers exposed. As a result, the edge of line images became rough, or the line images had disorder such as intermittence or the like, and line images or dotted images became irregular, so that granularity (roughness) was deteriorated particularly in half-tone portions. In addition, making examination in these methods for transferring toner development images (sequential transfer, and transfer in a lump by use of an intermediate body), the present inventor found that the first reason of generation of mottles from a high image density portion to a low image density portion was that electrostatic capacitance distribution was produced in a paper plane in accordance with its mass distribution or the like, and hence the strength of an electric field at the time of transfer varied in various places of the paper plane, so that distribution was produced in the quantity of toner to be transferred. The second reason was that toner melted at the time of fixing flowed into rough concave portions between fibers, so that uneven distribution of toner was caused in the paper surface layer.

Therefore, the present inventor deeply examined means for improving the image failure with respect to recording paper of the non-coated type. Taking into consideration the fact that images were changed by the structure of fibers constituting paper both in recording with a water-based liquid and in recording in a dry electrophotographic system, the present inventor examined the structure of fibers themselves through trial and error. As a result, the foregoing problem was solved by making the surface of recording paper have such a structure that the surface contains a mixture of hydrophilic fibers and hydrophobic fibers, particularly a so-called matrix structure in which those fibers got entangled in each other at random with directivity as less as possible.

That is, in recording with a water-based liquid, structures different in wetting and penetration of the water-based liquid are formed in the surface layer of paper with hydrophilic fibers and hydrophobic fibers, so that when the water-based liquid is given onto the paper, the water-based liquid is absorbed by the hydrophilic fibers, and dispersion of the liquid on the plane and excessive penetration into the inside of the paper are prevented by the water-repellent ability of the hydrophobic fibers. Thus, unnecessary bleeding of the liquid, and density decrease or density unevenness caused by simultaneous penetration of coloring particles, pigment or dye and the water-based liquid are prevented from occurring.

Figure 2:
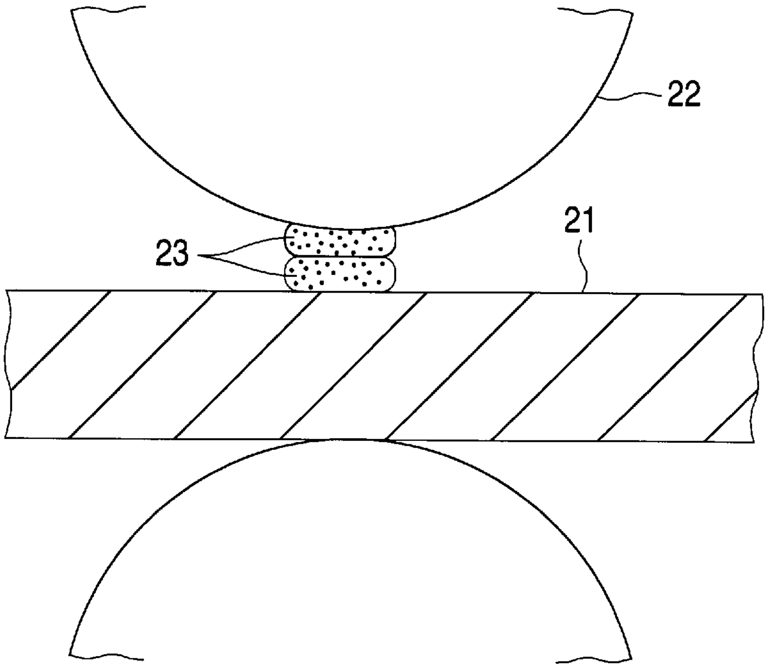
FIG. 2 is a typical view in the case where images are formed on the conventional recording paper.

In a dry electrophotographic recording system, on the other hand, by making recording paper have such a structure, particularly a matrix structure, in which hydrophilic fibers and hydrophobic fibers are mixed, inter-fiber bonding produced by hydrogen bond caused by OH groups of the hydrophilic fibers is blocked by the hydrophobic fibers, so that the hydrogen bond between fibers are cut appropriately and the fibers slide on each other to make it possible that the structure of the paper has a cushioning property. This point is typically shown in FIG. 1 illustrating the state where toner 13 is transferred from a toner holder 12 to paper 11 having such a cushioning property, in comparison with the state typically shown in FIG. 2 where toner 23 is transferred from a toner holder 22 to conventional paper 21 having no cushioning property.

Because of the above-mentioned cushioning property of the recording paper, transformation is produced in the recording paper by the cushioning characteristic correspondingly to the pressure generated when toner is electrostatically transferred to the recording paper, so that the thickness of the recording paper as a dielectric is decreased. Therefore, such a phenomenon that the dielectric film thickness in electrostatic transferring is decreased arises, and a transferring electric field becomes so large that the efficiency of transferring the toner to the recording paper becomes large. As a result, surprisingly, mottles of images which have been a serious problem in multiple transfer or sequential transfer in conventional color recording can be eliminated. This is more effective in a transferring method using a bias transfer roll, and effective also in a method where fixation is performed by heat and pressure simultaneously with transferring.

In addition, also in the case where toner transferred to recording paper according to the present invention is fixed, distance between heat sources is reduced by the cushion effect, particularly in a case of using both-surface heating rolls. Consequently, more effective heating is performed so that effective fixation can be obtained and it is possible to prevent partial fixation failures on the recording paper. In such a manner, it is possible to improve image quality failures such as density mottles, whiteness mottles, and so on.

In addition, also in a heat transfer recording system where a heat transfer film (donor film) including wax with pigment dispersed therein is transferred and fixed to recording paper by heat and pressure, recording paper according to the present invention having the stricture (particularly matrix structure) of hydrophilic fibers and hydrophobic fibers and having the cushioning property can reduce deterioration of granularity or density mottles caused by the dislocation of minute images, similarly to the case of recording in a dry electrophotographic system.

The embodiments of the present invention will be described below in detail with reference to the drawings.

Figure 3:
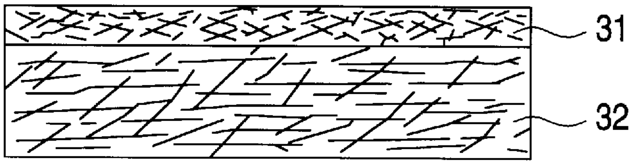
FIG. 3 is a typical view of one preferred mode of the recording paper according to the present invention.

FIG. 3 shows a preferred embodiment of recording paper according to the present invention, which has a double-layer structure. In this recording paper, a first layer 31 contains a mixture of hydrophilic fibers and hydrophobic fibers as main raw material. A second layer 32 is different from the first layer 31 in that it is constituted substantially by a layer of cellulose fibers the average length of which is larger than the respective average lengths of the hydrophilic fibers and hydrophobic fibers of the first layer 31.

The hydrophilic fibers of the first layer 31 may be selected from desired sorts of fibers known as hydrophilic resin in the art. Examples of them include polypeptide fibers of silk, wool, catgut, collagen, etc.; cellulose fibers; polysaccharide fibers of alginic acids such as calcium alginate, and chitin. The cellulose fibers are preferable from the point of view of a water absorption property in recording with a water-based liquid. The examples which may be used as the cellulose fibers include plant fibers such as wood fibers based on coniferous or broadleaf trees; seed fibers such as cotton, linter, kapok, etc.; bast fibers such as flax, hemp, ramie, kozo, mitsumata, gampi, etc.; leaf fibers such as Manila hemp, sisal hemp, esparto, etc.; stem fibers such as bagasse, straw, bamboo, etc. The examples may further include green algae fibers such as valonia cellulose, etc.; bacteria fibers such as bacteria cellulose, etc.; ascidians; and so on. Further, also waste-paper pulp may be used.

Further, the hydrophobic fibers of the first layer 31 may be selected from any sorts of fibers known as hydrophobic resin in the art.

Fibers having properties of a boundary area between hydrophilicity and hydrophobicity may be defined as hydrophobic fibers if the other fibers used in the first layer 31 are more hydrophilic, and it may be defined as hydrophilic fibers if the other fibers used in the first layer 31 are more. hydrophobic. That is, the hydrophilic fibers and the hydrophobic fibers may be defined relatively to each other taking the properties of the respective fibers into consideration.

Examples of the hydrophobic fibers include: synthetic fibers such as polyester fibers, polyacrylonitrile fibers, polyvinylalcohol fibers, polyvinyl chloride fibers, polyolefin fibers of polyethylene, polypropylene, etc., polyvinylidene chloride fibers, polyurethane fibers, polyvinyl chloride-polyvinylalcohol copolymer fibers, polyalkylene para-oxybenzoate fibers, fluorocarbon fibers, polyamide fibers, etc.; and inorganic fibers including amorphous fibers such as glass fibers, tyrano fiber, etc., polycrystalline fibers such as alumina fibers, zirconia fibers, etc., single-crystal fibers such as alumina whiskers, potassium titanate fibers, asbestos, etc.

As is apparent from the comparison between the average length of the cellulose fibers of the second layer 32 and the average length of the hydrophilic or hydrophobic fibers of the first layer 31, both the hydrophilic fibers and the hydrophobic fibers of the first layer 31 are made fine.

As mentioned above, it is preferable to use fined fibers to constitute a surface portion or a surface layer of the recording paper according to the present invention. By constituting the surface layer by the fined fibers, voids in the surface formed of the fibers become small, and at the same time, the matrix of the hydrophilic fibers and the hydrophobic fibers can be formed of small units. In the case of water-based liquid recording, a flow of the liquid along coarse capillaries can be prevented, the specific surface area is increased by fining the hydrophilic fibers, and the quantity of OH groups per unit area increases so that the ability of water absorption is also increased. In addition, because the matrix units absorbing the water-based liquid can be made small, it is possible to prevent unevenness of penetration of coloring particles, dye or pigment, uneven dispersion in the direction of plane, and inter-color color-mixture bleeding. Consequently, it is possible to attain image quality in which lines are sharper, resolution is higher, a coloring property is superior, and the image has no mottles. In addition, also in a dry electrophotographic system, it is possible to prevent powder toner from falling into coarse voids between fibers at the time of transferring or fixing, or to prevent melted toner from flowing into the coarse voids between fibers, and particularly, it is possible to improve the sharpness of line images, and the granularity in the half-tone areas.

The roughness or fineness of the hydrophilic fibers is preferably expressed by Canadian standard freeness based on JIS P 8121. It means that the larger this value, the rougher the hydrophilic fibers. It is preferable that the degree of the fineness of the hydrophilic fibers of the first layer is not more than 300 ml and not less than 50 ml, and more preferably it is not more than 250 ml and not less than 100 ml, according to Canadian standard freeness. When the Canadian standard freeness is 300 ml or more, it is true that there are effects in prevention of bleeding of the water-based liquid, in the prevention of image mottles by the improvement of the cushioning property in the paper surface layer, etc. But the fibers are rough, and the voids produced between the fibers are also coarse. Accordingly, the effect in prevention of bleeding is not so large as mentioned above. Further, in dry electrophotographic recording, or the like, the effect in improvement of sharpness of lines and the granularity in half-tone areas are somewhat poor. If the Canadian standard freeness is less than 50 ml, undesirably, water retention becomes so large when paper is produced by wet paper machining that water cutting is poor, the production becomes difficult, and the opacity of the paper is reduced.

The roughness or fineness of the hydrophobic fibers is preferably expressed not by Canadian standard freeness but by thickness and length. Preferably, the hydrophobic fibers of the first layer have thickness of 2 denier or less, and fiber length of 4 mm or less. More preferably, the thickness is 1 denier or less, and the fiber length is 2 mm or less. If the thickness is 2 denier or more and the fiber length is 4 mm or more, the effects in prevention of bleeding, sharpness of lines, and improvement of granularity become slightly poor by the influence of expanded voids between fibers similarly to the above-mentioned hydrophilic fibers.

It is preferable to set the blend ratio of the hydrophilic fibers to the hydrophobic fibers in the first layer 31 such that the hydrophobic fibers are in a range of from 10 weight units to 100 weight units relative to 100 weight units of the hydrophilic fibers. More preferably, the blend ratio is set so that the hydrophobic fibers are in a range of from 15 weight units to 70 weight units. If the blend ratio of the hydrophobic fibers is beyond 100 weight units, a hydrophobic area becomes so large that the penetration of the water-based liquid is blocked, so that inter-color bleeding or image mottles are produced easily. In addition, it is not preferable that bonds between fibers based on hydrogen bonds formed by OH groups of the hydrophilic fibers are apt to be cut off, so that particularly the surface strength of the paper is reduced, easily causing a trouble such as production of paper powder, and so on. If the blend ratio of the hydrophobic fibers is under 10 weight units, the effect of the mixture of the hydrophobic fibers as mentioned above is too small. It is therefore preferable that the hydrophobic fibers of not less than 10 weight units are to mixed.

In order to effectively provide the hydrophilic fibers and the hydrophobic fibers of the first layer 31 in a matrix, it is preferable to adjust the fiber orientation ratio in an ultrasonic wave propagation velocity method to be 1.0 to 1.4. By this measure, the hydrophilic and hydrophobic fibers constituting the paper are not oriented in the direction of travel of a paper machine, but is constituted in comparatively random directions. More preferably, the fiber orientation ratio is set to the region from 1.0 to 1.3. Consequently, bleeding of a water-based liquid along hydrophilic fibers is easily cut down by hydrophobic fibers so that the effect to prevent bleeding is increased, and the orientation of fibers becomes random so that the effect to have a cushioning property is large.

The above-mentioned fiber orientation ratio in an ultrasonic wave propagation method means the ratio of the ultrasonic wave propagation velocity of MD (Machine Direction) to that of CD (Cross Direction), and it is expressed by the following equation.

Fiber orientation ratio by an ultrasonic wave propagation method=ultrasonic wave propagation velocity of MD/ultrasonic wave propagation velocity of CD.

Figure 4:
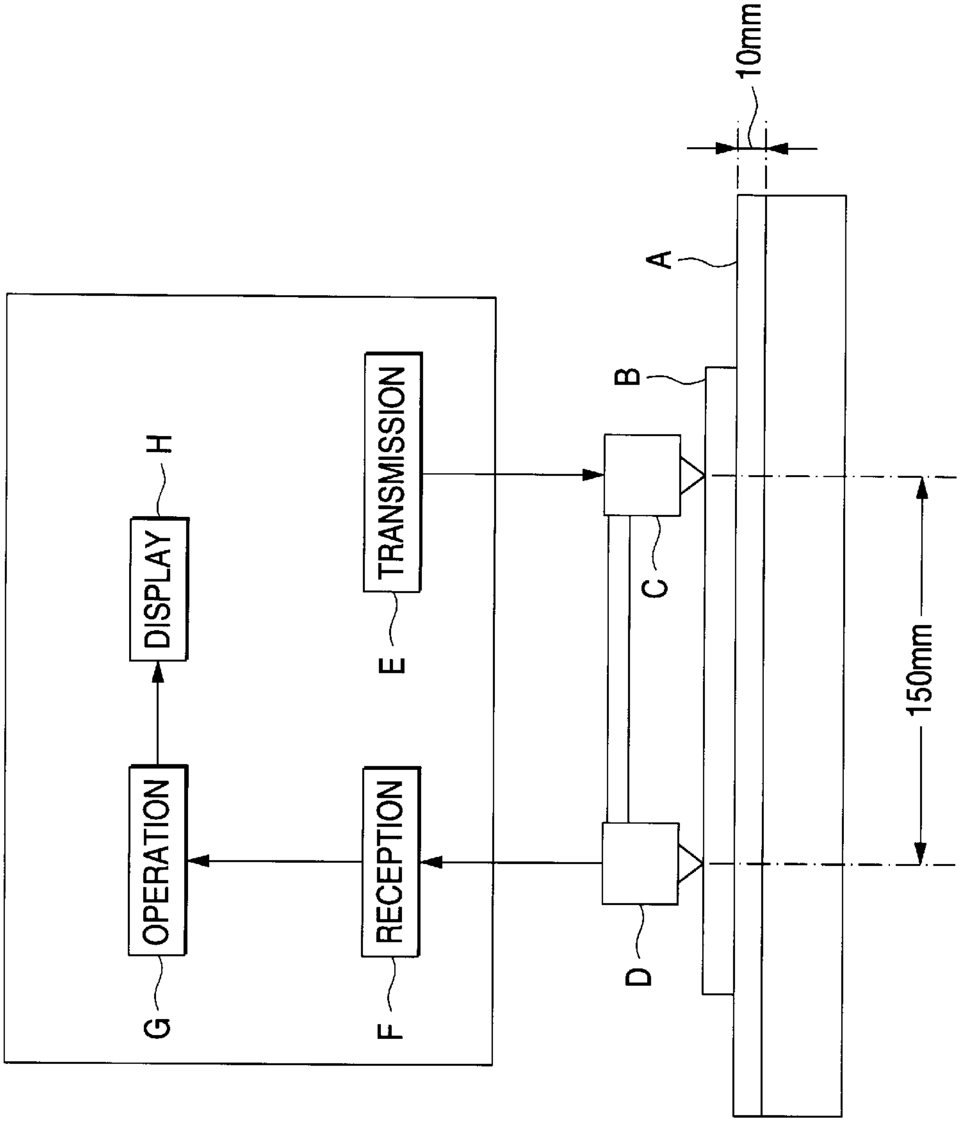
FIG. 4 is a schematic structural diagram of an apparatus for carrying out measurement of a fiber orientation ratio by an ultrasonic wave propagation method.

The fiber orientation ratio by an ultrasonic wave propagation method is obtained by a measuring method shown in FIG. 4. That is, a sample B is put on a bubble containing rubber plate A 10 mm thick, and brought into contact with a transmission vibrator C and a reception vibrator D separated by 150 mm from each other, and a longitudinal wave of ultrasonic pulses is transmitted from a transmission portion E, and received by a reception portion F, so that the period of time from the time when the wave is passed through the sample from the transmission vibrator C to the time when the wave is received by the reception vibrator D is measured, and converted into a propagation velocity. Propagation velocities in both the directions of MD and CD of each sample are measured, and the propagation velocity ratio is obtained. The arithmetical operation relating to the above-mentioned operation is performed by an arithmetical operation element G, and the result is displayed on a display element H.

Although the second layer 32 of the recording paper shown in FIG. 3 is sufficient if the average length of its cellulose fibers is larger than the average length of the hydrophilic fibers of the first layer or the average length of the hydrophobic fibers, it is preferable that the second layer 32 is a layer machined out of cellulose fibers which are low in the degree of beating such that the Canadian standard freeness thereof is 400 ml or more, more preferably 450 ml or more. Consequently, the paper can have a rigid layer, so that it is possible to improve the bending rigidity of the paper which is important with respect to the carriage property or curl of the paper.

On the surface of the second layer 32 of the recording paper having the structure shown in FIG. 3, and/or between the first layer 31 and the second layer 32, one or more other desired layers may be disposed in accordance with user's will.

It is more advantageous to use the matrix structure of hydrophilic fibers and hydrophobic fibers as two surface layers of multi-layer paper having a multi-layer structure. That is, from the point of view of adaptivity to double-sided record or the like, it is preferable that the matrix structure of hydrophilic fibers and hydrophobic fibers is formed on both the outermost layers of the three or more layers, and the layers other than the outermost layers, for example, layers substantially consisting of cellulose fibers are formed as internal layers. For the same reason as mentioned above, it is preferable that layers machined out of cellulose fibers which are low in the degree of beating such that the Canadian standard freeness is 400 ml or more, are used as the internal layers.

Figure 5:
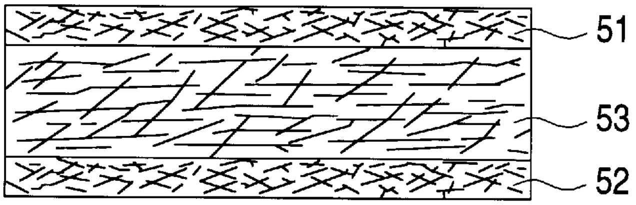
FIG. 5 is a typical view of another preferred mode of the recording paper according to the present invention.

FIG. 5 shows an example of such a mode. This is recording paper in which a layer similar to a first layer 51 is provided as a third layer 53 in the structure of the first layer 51 and a second layer 52, which is similar to the structure of FIG. 3, specifically, on the surface of the second layer 52 opposite to the side of the first layer 51.

If the water repellency of internal layers such as the second layer 52 is controlled by the addition of a sizing agent, the quantity of internal penetration of a water-based liquid can be controlled to leave dye, pigment or coloring particles near the surface layers, so that it is possible to improve the coloring property. Thus the image quality in water-based liquid recording can be more improved and the curl and paper feeding performance including a dry electrophotographic system can be improved. Sizing agents which can be used are not limited specifically. Sizing agents such as rhodin sizing agents, synthetic sizing agents, petroleum resin sizing agents, neutral sizing agents, etc., can be used in combination with a desired fixing agent for fixing a sizing agent and fibers, such as aluminum sulphate, cationized starch, and so on. In addition to this, it is possible to add a paper strengthening agent such as polyacrylamide, etc., a water-soluble bonding agent such as starch, glue, casein, polyvinyl alcohol, etc., and a hot-melt bonding agent such as ethylene-vinyl acetate copolymer, polyethylene, polyamide, etc., in order to accelerate the bonding of hydrophilic fibers and hydrophobic fibers In addition, it is possible to add dye or colored pigment to adjust color tone, or it is possible to add fluorescent dye to improve visual whiteness. Further, a PH controlling agent or the like may be added.

The paper machining method for manufacturing the recording paper according to the present invention is not limited specifically. Any of a multi-layer paper machining method which will be described later, a Fortlinear paper machine, a cylinder paper machine, and a twin wire system or the like which have been conventionally known can be used. Either an acidic or a neutral paper machining method may be used. Since the fiber orientation ratio in an ultrasonic wave propagation velocity method on recording paper machined is preferably not less than 1.0 and not more than 1.4 as mentioned above, it is effective to adjust the ratio Jet/Wire (raw material spraying velocity/paper machine wire velocity) of the paper machine. In addition to this, the ratio Jet/Wire is controlled by adjusting tension horizontally and vertically against the flow of paper at the time of pressing, dryer drying, and so on.

Methods of multi-layer paper machining to manufacture multi-layer recording paper are, for example, disclosed in detail in "PULP AND PAPER Chemistry and Chemical Technology", Third Edition, Volume 2, Feb. 1984, Edited by James P. Casey. Any of the disclosed methods may be used, and further the present invention is not limited to these methods so long as multi-layer paper can be machined.

Loading material may be used in the recording paper according to the present invention in accordance with necessity. The sort of the loading material is not limited specifically, but it is possible to use calcium carbonate loading material such as heavy calcium carbonate, light calcium carbonate, chalk, etc., silicate inorganic loading material such as kaolin, calcined clay, pyrophillite, sericite, talc, amorphous silica, colloidal silica, white carbon, etc., inorganic loading material such as titanium dioxide, aluminum hydroxide, satin white, calcium sulfate, barium sulfate, zinc oxide, magnesium oxide, etc., and organic pigments such as urea resin particles, polystyrene resin particles, microballoon particles, etc. Mixing Of calcium carbonate in neutral paper machining is preferable from the point of view of retaining image quality and improving the degree of whiteness in an electrophotographic system.

In machining the recording paper according to the present invention, a surface sizing agent such as starch, a cellulose derivative such as carboxy methyl cellulose, etc., polyvinyl alcohol, styrene-acrylate, styrene-maleate, olefin-maleate, alkyl-ketene dimer, etc. may be given by a small amount by a size press, a gate roll coater or the like to an extent that absorption of a water-based liquid is not blocked, from the point of view of improving the surface strength.

Further, minerals such as sodium chloride, potassium chloride, calcium chloride, sodium sulfate, zinc oxide, titanium dioxide, tin oxide, aluminum oxide, magnesium oxide, etc., or organic material such as alkyl phosphate, alkyl sulfate, sodium sulfonate, quaternary ammonium salt, etc. can be used individually or in mixture in the surface sizing agent and/or inside the paper in order to adjust the electric resistance.

The region of preferable surface electric resistance of recording paper according to the present invention is based on JIS K 6911 so that the surface electric resistance measured in the environment the humidity of which is perfectly conditioned to 20° C. 65% R.H. is in a range of from $1\times10^9$ to $2\times10^{10}\Omega$. When the surface electric resistance is beyond $2\times10^{10}\Omega$, a paper feeding trouble caused by discharge, or an image quality failure is produced in recording in a dry electrophotographic system, particularly under a low humidity environment. Specifically, electrostatic winding to a photosensitive body or a fixing roll, or an accumulation failure or jam in a paper outlet tray or a sorter is produced as a paper feeding trouble. Undesirably, a transfer failure or the like which is caused by scattering of toner images due to a separation discharge phenomenon in a transfer process, fogging of background, and decrease of specific inductive capacity, is produced as an image quality failure. In addition, when the surface electric resistance is under $1\times10^9\Omega$, particularly in high humidity conditions, the resistance of the paper surface is decreased too much to hold enough charges on the paper surface so as to obtain a transferring electric field, so that a transferring failure is produced undesirably.

Preferably, the recording paper according to the present invention is smoothed by a machine calender, a super calender, or the like, so as to takes 40 to 200 seconds in Beck smoothness. More preferably, the paper is machined to be 60 to 150 seconds in Beck smoothness. The paper the Beck smoothness of which is less than 40 seconds may be insufficient for good transferring. On the other hand, if the surface is finished to have high smoothness beyond 200 seconds in Beck smoothness, the properties of general paper is lost, and the thickness of the paper is decreased so that enough rigidity can not be kept, possibly causing a trouble in the paper feeding performance, and so on.

Although the grammage of the recording paper according to the present invention is not limited specifically, it is preferable to set the grammage so as to be not less than 64 $g/m^2$ and not more than 110 $g/m^2$. When the grammage is beyond 110 $g/m^2$, the thermal conductivity is deteriorated at the time of fixation, so that it is impossible in dry electrophotographic recording to melt toner uniformly and sufficiently, and unevenness of melting is apt to be produced so as to produce density unevenness, gloss unevenness or a fixation failures in a high image density portion, or residual paper is too much, possibly causing a running failure. On the other hand, if the grammage is under 64 $g/m^2$, toner is melted too much at the time of fixation in dry electrophotographic recording, so that there may be a case where penetration unevenness of toner is produced slightly so as to deteriorate granularity or the like, or there may be a case where image gloss becomes too high. In addition, water-based solvent penetrates the inside of paper in water-based liquid recording, so that, undesirably, there is a tendency to arise a phenomenon of image through to the back, or a phenomenon of back visibility in which an image on the recording surface can be seen through from the back, and further curl is apt to be produced.

Although the whiteness of the recording paper according to the present invention is not limited specifically, preferably it is made 80% or more in whiteness by Hunter, or more preferably 82% or more on the assumption that a full color copying machine/printer is used. When the whiteness by Hunter is under 80%, color saturation and brightness are decreased at the time of color recording, so that it is difficult to reproduce clear recording.

In the case where the recording paper according to the present invention is enclosed, it is preferable to make adjustment that the enclosed recording has appropriate moisture of 4.0 to 6.5% immediately after opened in order to sufficiently restrain waviness in dry electrophotographic recording or production of curl after copying. In addition, not to produce moisture-uptake or dehumidification at the time of storage, it is preferable to pack the recording paper with water vaporproof packaging paper such as polyethylene laminated paper, etc. polypropylene, or the like.

EXAMPLES

The present invention will be described specifically with evaluation results of examples and comparatives based on the combinations of recording paper samples A-1 to 4, B-1, C-1 to 2, D-1 to 5, E-1, F-1, G-1 to 3, and H-1 to 3, and recording methods 1 to 4 shown in Tables 1 to 3, and recording paper samples and recording methods shown in Tables 4 to 6, but the present invention is not limited to these combinations.

Recording Paper Samples (Samples A-1 to A-4 according to the present invention, Table 1)

As hydrophilic fibers, leaf bleached kraft pulp (LBKP) which was cellulose fibers was beaten by a disc refiner so as to be 400 ml in Canadian standard freeness. As hydrophobic fibers, polyester fibers (KURARAY-ESTER EP053, Kuraray Co., Ltd.) 3 mm long and 0.5 denier wide were mixed at the ratio of the hydrophobic fibers 50 weight units to the hydrophilic fibers 100 weight units. Alkenyl succinyl oxide 0.07 weight % was added as an inner additive sizing agent to this fiber sample, and further cationized starch was added by 0.1 weight % as a bonding agent of the inner additive sizing agent to the fibers. In addition, calcium carbonate was mixed by 8 weight % as loading material. The paper material in which those materials were mixed was machined by an experimental orientation paper machine (made by Kumagaya Riki Kogyo Co., Ltd.) so that the ratio JET/WIRE was adjusted to make the fiber orientation ratio be 1.3 and the grammage be about a little less than 80 $g/m^2$. Further, oxidized starch (ACE A, made by Oji National) 1.0 $g/m^2$ and NaCl 0.1 $g/m^2$ were coated by an experimental size press (made by Kumagaya Riki Kogyo Co., Ltd.) so that the grammage was finally made to be 80 $g/m^2$, and further the paper was finished by calendering so that the smoothness was 70 seconds, so as to obtain a recording paper sample A-1 according to the present invention.

Recording paper samples A-2, A-3 and A-4 according to the present invention were made up in the same manner as the recording paper sample A-1, except that the conditions of the disc refiner was changed from the recording paper sample A-1 so that the Canadian standard freeness of LBKP was changed to 300 ml, 250 ml and 150 ml.

(A sample B-1 according to the present invention, Table 1)

A recording paper sample B-1 according to the present invention was obtained in the same manner as the recording paper sample A-2, except that chitin and LBKP were mixed as the sort of hydrophilic fibers unlike the recording paper sample A-2.

(Samples C-1 to C-2 according to the present invention, Table 1)

Recording paper samples C-1 to C-2 according to the present invention were obtained in the same manner as the recording paper sample A-2 according to the present invention, except that the sort of hydrophobic fibers was changed from that in the recording paper sample A-2, so that polyvinyl alcohol (PVA) fibers (FIBREBOND, Sansho) 4 mm long and 1 denier wide were used in the sample C-1, and acrylic fibers (CASHMIRON A101, made by Asahi Chemical Industry) 3 mm long and 1.5 denier wide were used in the sample C-2.

(Samples D-1 to D-4 according to the present invention and a comparative sample D-5, Table 2)

Recording paper samples D-1 to D-4 according to the present invention and a recording paper comparative sample D-5 were obtained in the same manner as the recording paper sample A-2, except that the mixing quantity of hydrophobic fibers was changed from that in the recording paper sample A-2 such that, relative to hydrophilic fibers 100 weight units, hydrophobic fibers were mixed to the former by 120 weight units in the sample D-1, by 100 weight units in the sample D-2, by 10 weight units in the sample D-3, by 5 weight units in the sample D-4, and only hydrophilic fibers were used without using hydrophilic fibers in the sample D-5.

(A comparative sample E-1, Table 3)

A recording paper comparative sample E-1 was obtained in the same manner as the recording paper sample A-2, except that, unlike the recording paper sample A-2, hydrophobic fibers were not used, and the Canadian standard freeness of hydrophilic fibers was made to be 150 ml.

(A sample F-1 according to the present invention, Table 3)

A recording paper sample F-1 according to the present invention was obtained in the same manner as the recording paper sample A-2, except that, unlike the recording paper sample A-2, polyester fibers (KURARAY-ESTER EP303, made by Kuraray) 3 mm long and 0.5 denier wide were used as the hydrophobic fibers.

(Samples G-1 to G-3 according to the present invention, Table 3)

Recording paper samples G-1 to G-3 according to the present invention were obtained in the same manner as the recording paper sample A-2, except that, unlike the recording paper sample A-2, the ratio JET/WIRE was changed such that the fiber orientation ratio was changed to 1.10, 1.40, and 1.50.

(Samples H-1 and H-2 according to the present invention, and a comparative sample H-3, Table 4)

While the samples A to G were single-layer recording paper samples, it was attempted to make up multi-layer (three-layer) recording paper samples.

As hydrophilic fibers, broadleaf bleached kraft pulp (LBKP) which was cellulose fibers was beaten by a disc refiner so as to be 400 ml in Canadian standard freeness. Alkenyl succinyl oxide 0.07 weight % was added as an inner additive sizing agent to this fiber sample, and further cationized starch was added by 0.1 weight % as a bonding agent of the inner additive sizing agent to the fibers. In addition, calcium carbonate was mixed by 8 weight % as loading material. The paper material in which these materials were mixed was machined by an experimental orientation paper machine (made by Kumagaya Riki Kogyo Co., Ltd.) so that the ratio JET/WIRE was adjusted to make the fiber orientation ratio be 1.3 and the grammage about a little less than 60 $g/m^2$, so that the sample was made to be an internal layer sample. Further, broadleaf bleached kraft pulp (LBKP) which was cellulose fibers was beaten by the disc refiner so as to be 300 ml in Canadian standard freeness. As hydrophobic fibers, polyester fibers (KURARAY-ESTER EP053, made by Kuraray) 3 mm long and 0.5 denier wide were mixed at the ratio of the hydrophobic fibers 50 weight units to the hydrophilic fibers 100 weight units. Alkenyl succinyl oxide 0.07 weight % was added as an inner additive sizing agent to this fiber sample, and further cationized starch was added by 0.1 weight % as a bonding agent of the inner additive sizing agent to the fibers. In addition, calcium carbonate was mixed by 8 weight % as loading material. The paper material in which those materials were mixed was machined by an experimental orientation paper machine (made by Kumagaya Riki Kogyo Co., Ltd.) so that the ratio JET/WIRE was adjusted to make the fiber orientation ratio be 1.3 and the grammage be about a little less than 10 $g/m^2$, so that the sample was made to be a front surface sample. A back surface sample was obtained in the same manner as the front surface sample.

The internal sample and the front and back surface samples obtained thus were combined in the wet state at the time of pressing, and made into a three-layer structure. Further, oxidized starch (ACE A, made by Oji National) 1.0 $g/m^2$ and NaCl 0.1 $g/m^2$ were coated by an experimental size press (made by Kumagaya Riki Kogyo Co., Ltd.) so that the grammage was finally made to be 80 $g/m^2$, and further the paper was finished by calendering so that the smoothness was 70 seconds, so as to obtain a recording paper sample H-1 according to the present invention.

A recording paper sample H-2 according to the present invention was obtained in the same manner as the recording paper sample H-1, except that, unlike the recording paper sample H-1, the Canadian standard freeness of LBKP for the internal layer was changed into 300 ml.

In addition, a recording paper sample H-3 was obtained in the same manner as the sample H-1, except that, unlike the recording paper sample H-1, the hydrophobic fibers for the front and back surface layers were eliminated.

TABLE 1

| | sample | A1 | A2 | A3 | A4 | B1 | C1 | C2 |
|---|---|---|---|---|---|---|---|---|
| | grammage ($g/m^2$) | 80 | 80 | 80 | 80 | 80 | 80 | 80 |
| HYDROPHILIC FIBERS | sort fibers (LBKP) | cellulose fibers (LBKP) | cellulose fibers (LBKP) | cellulose fibers (LBKP) | cellulose wt % cellulose fibers 60 | chitin 40 fibers (LBKP) | cellulose fibers (LBKP) | cellulose |

TABLE 1-continued

| | sample | A1 | A2 | A3 | A4 | B1 | C1 | C2 |
|---|---|---|---|---|---|---|---|---|
| | grammage ($g/m^2$) | 80 | 80 | 80 | 80 | 80 | 80 | 80 |
| | | | | | wt % | | | |
| loads (wt. unit) | 100 | 100 | 100 | 100 | 100 | 100 | 100 | |
| freeness (ml, CSF) | 400 | 300 | 250 | 150 | 300 | 300 | 300 | |
| HYDROPHILIC FIBERS | sort | polyester fibers | polyester fibers | polyester fibers | polyester fibers | polyester fibers | PVA fibers fibers | acrylic |
| | loads (wt. unit) | 50 | 50 | 50 | 50 | 50 | 50 | 50 |
| | length (mm) | 3 | 3 | 3 | 3 | 3 | | |
| | width (denier) | 0.5 | 0.5 | 0.5 | 0.5 | 0.5 | | |
| | fiber orientation ratio | 1.30 | 1.30 | 1.30 | 1.30 | 1.30 | 1.30 | 1.30 |
| | surface sizing (sort, wt %) | stratch ($1g/m^2$) NaCl ($0.1\ g/m^2$) | stratch ($1\ g/m^2$) NaCl ($0.1\ g/m^2$) | stratch ($1\ g/m^2$) NaCl ($0.1\ g/m^2$) | stratch ($1\ g/m^2$) NaCl ($0.1\ g/m^2$) | stratch ($1\ g/m^2$) NaCl ($0.1\ g/m^2$) | stratch ($1\ g/m^2$) NaCl ($0.1\ g/m^2$) | stratch ($1g/m^2$) NaCl ($0.1\ g/m^2$) |
| | inner additive sizing (sort, wt %) | ASA | ASA | ASA | ASA | ASA | ASA | ASA |
| | loading material (sort, wt %) | $CaCO_3$ | $CaCO_3$ | $CaCO_3$ | $CaCO_3$ | $CaCO_3$ | $CaCO_3$ | $CaCO_3$ |
| | sizing degree (sec.) | 20 sec. | 20 sec. | 20 sec. | 20 sec. | 20 sec. | 20 sec. | 20 sec. |
| | surface electric resistivity (Ω) | $5 \times 10^9$ | $5 \times 10^9$ | $5 \times 10^9$ | $5 \times 10^9$ | $5 \times 10^9$ | $5 \times 10^9$ | $5 \times 10^9$ |

TABLE 2

| sample | D1 | D2 | D3 | D4 | D5 |
|---|---|---|---|---|---|
| grammage($g/m^2$) | 80 | 80 | 80 | 80 | 80 |
| HYDROPHILIC FIBERS | | | | | |
| sort | cellulose fibers (LBKP) | celiulose fibers (LBKP) | cellulose fibers (LBKP) | cellulose fibers (LBKP) | cellulose fibers (LBKP) |
| loads (wt. unit) | 100 | 100 | 100 | 100 | 100 |
| freeness (ml, CSF) | 300 | 300 | 300 | 300 | 300 |
| HYDROPHILIC FIBERS | | | | | |
| sort | polyester fibers | polyester fibers | polyester fibers | polyester fibers | none |
| loads (wt. unit) | 120 | 100 | 10 | 5 | 0 |
| length (mm) | 3 | 3 | 3 | | |
| width (denier) | 0.5 | 0.5 | 0.5 | 0.5 | |
| fiber orientation ratio | 1.30 | 1.30 | 1.30 | 1.30 | 1.30 |
| surface sizing (sort, wt %) | stratch ($1\ g/m^2$) NaCl ($0.1\ g/m^2$) | stratch ($1\ g/m^2$) NaCl ($0.1\ g/m^2$) | stratch ($1\ g/m^2$) NaCl ($0.1\ g/m^2$) | stratch ($1\ g/m^2$) NaCl ($0.1\ g/m^2$) | stratch ($1\ g/m^2$) NaCl ($0.1\ g/m^2$) |
| inner additive sizing (sort, wt %) | ASA | ASA | ASA | ASA | ASA |
| loading material (sort, wt %) | $CaCO_3$ | $CaCO_3$ | $CaCO_3$ | $CaCO_3$ | $CaCO_3$ |
| sizing degree (sec.) | 20 sec. | 20 sec. | 20 sec. | 20 sec. | 20 sec. |
| surface electric resistivity (Ω) | $5 \times 10^9$ | $5 \times 10^9$ | $5 \times 10^9$ | $5 \times 10^9$ | $5 \times 10^9$ |

TABLE 3

| sample | E1 | F1 | G1 | G2 | G3 |
|---|---|---|---|---|---|
| grammage ($g/m^2$) | 80 | 80 | 80 | 80 | 80 |
| HYDROPHILIC FIBERS | | | | | |
| sort | cellulose fibers (LBKP) | cellulose fibers (LBKP) | cellulose fibers (LBKP) | cellulose fibers (LBKP) | cellulose fibers (LBKP) |
| loads (wt. unit) | 100 | 100 | 100 | 100 | |
| freeness (ml, CSF) | 150 | 300 | 300 | 300 | 300 |
| HYDROPHILIC FIBERS | | | | | |
| sort | none | polyester fibers | polyester fibers | polyester fibers | none |
| loads (wt. unit) | 0 | 50 | 50 | 50 | 50 |
| length (mm) | — | 5 | 3 | 3 | 3 |
| width (denier) | — | 3 | 0.5 | 0.5 | 0.5 |
| fiber orientation ratio | 1.30 | 1.30 | 1.10 | 1.40 | 1.50 |
| surface sizing (sort, wt %) | stratch ($1 g/m^2$) NaCl ($0.1 g/m^2$) | stratch ($1 g/m^2$) NaCl ($0.1 g/m^2$) | stratch ($1 g/m^2$) NaCl ($0.1 g/m^2$) | stratch ($1 g/m^2$) NaCl ($0.1 g/m^2$) | stratch ($1 g/m^2$) NaCl ($0.1 g/m^2$) |
| inner additive sizing (sort, wt %) | ASA | ASA | ASA | ASA | ASA |
| loading metarial (sort, wt %) | $CaCO_3$ | $CaCO_3$ | $CaCO_3$ | $CaCO_3$ | |
| sizing degree (sec.) | 20 sec. | 20 sec. | 20 sec. | 20 sec. | 20 sec. |
| surface electric resistivity (Ω) | $5 \times 10^9$ | $5 \times 10^9$ | $5 \times 10^9$ | $5 \times 10^9$ | $5 \times 10^9$ |

TABLE 4

| sample | H1 | H2 | H3 |
|---|---|---|---|
| grammage ($g/m^2$) | 80 | 80 | 80 |
| HYDROPHILIC SURFACE LAYERS | | | |
| sort | cellulose fibers (LBKP) | cellulose fibers (LBKP) | cellulose fibers (LBKP) |
| loads (wt. unit) | 100 | 100 | 100 |
| freeness (ml, CSF) | 300 | 300 | 300 |
| HYDROPHILIC | | | |
| sort | polyester fibers | polyester fibers | none |
| loads (wt. unit) | 50 | 50 | 0 |
| length (mm) | 3 | 3 | — |
| width (denier) | 0.5 | 0.5 | — |
| HYDROPHILIC INNER LAYER | | | |
| sort | LBKP | LBKP | LBKP |
| loads (wt. unit) | 100 | 100 | 100 |
| freeness (ml, CSF) | 400 | 300 | 400 |
| HYDROPHILIC | | | |
| sort | none | none | none |
| loads (wt. unit) | 0 | 0 | 0 |
| length (mm) | — | — | — |
| width (denier) | — | — | — |
| fiber orientation ratio | 1.30 | 1.30 | 1.30 |

TABLE 4-continued

| sample | H1 | H2 | H3 |
|---|---|---|---|
| sizing degree (sec.) | 20 sec. | 20 sec. | 20 sec. |
| surface electric resistivity (Ω) | 5x109 | 5x109 | |

Recording Method (Recording method 1)

As an ink jet recording method with a water-based liquid, solid, half-tone, and high-light 2 cm×2 cm patches of yellow, magenta, cyan, red, green and blue were recorded on the above-mentioned respective recording paper samples, in contact with each other without any interval therebetween, by an ink jet recording apparatus MJ-5000C (made by Seiko Epson Corp.). In addition, one-dot and four-dot width lines of yellow, magenta, cyan, red, green and blue were recorded on the above-mentioned respective recording paper samples.

Figure 6:
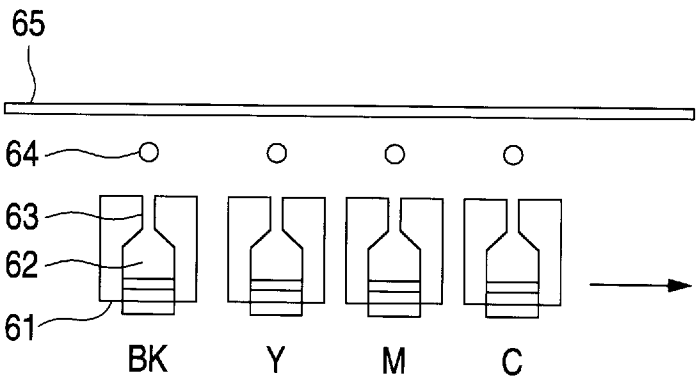
FIG. 6 is a typical view for explaining a mode of a recording method (ink jet recording) according to the present invention.

The recording method 1 will be described specifically with reference to FIG. 6. A current was supplied to a piezoelectric body 61 in accordance with an image recording signal to thereby change the size of the piezoelectric body 61. Consequently, ink 62 in which dye was dissolved was pushed, and drop-like ink 64 was injected from a nozzle 63, so that recording was performed on recording paper 65. A color image was obtained by injecting inks of cyan, magenta, yellow and black sequentially.

(Recording method 2)

A recording apparatus using this recording method had a developing device opposite to the surface of an electrostatic latent image carrier at a very small distance. A water-based developer containing pigment was sprayed from the developing device to an electrostatic latent image to thereby make the latent image visible. Recording paper was held between transfer rollers disposed in opposition to the electrostatic latent image carrier, and the developed image on the electrostatic latent image carrier was transferred by the pressure to thereby perform recording. In addition, this recording apparatus had water-based developers containing pigments of yellow, magenta and cyan, and had individual electrostatic latent image carriers, developing devices and transfer rollers. Solid, half-tone, and high-light 2 cm×2 cm patches of yellow, magenta, cyan, red, green and blue were recorded on the above-mentioned respective recording paper samples in contact with each other without any distance therebetween, by this recording apparatus. In addition, respective 120 μm width lines of yellow, magenta, cyan, red, green and blue were recorded on the above-mentioned respective recording paper samples.

Figure 7B:
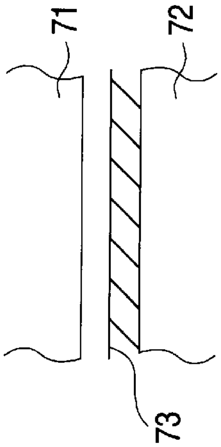
FIG. 7A to 7D are a typical view for explaining a mode of a recording method (water-based ink transfer recording) according to the present invention.
Figure 7C:
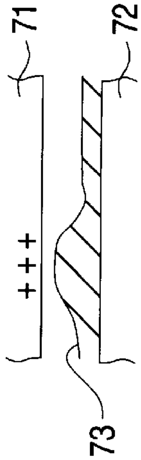
Figure 7D:
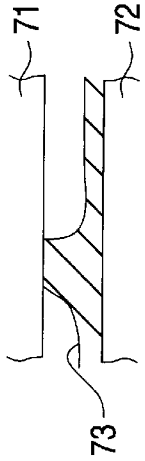
Figure 7A:
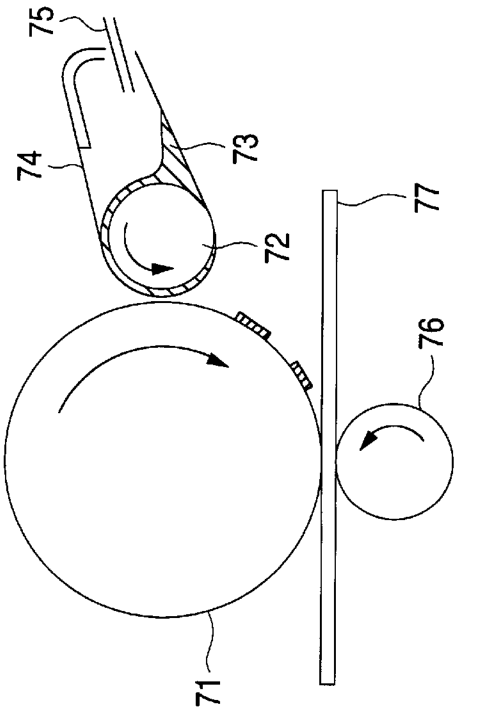

The recording method 2 will be described specifically with reference to FIG. 7. As shown in FIG. 7(A), an electrostatic latent image was formed on an electrostatic latent image carrier 71 in accordance with an image signal, and an water-based ink 73 which was supplied from an ink supply nozzle 75 and in which coloring pigment was dispersed was spread to form a thin layer by means of a doctor blade 74, on a developing roll 72 disposed near the carrier 71. At this time, the water-based ink 73 on the developing roll 72 is controlled to have a gap of 50 μm so as not to contact with the electrostatic latent image carrier 71. In such a state, as shown in FIG. 7(B) to (D), the water-based ink 73 swelled to the electrostatic latent image and contacted with the latent image portion so as to make the latent image visible. By this measure, the developed image was transferred to recording paper 77 by the pressure of transfer rollers 76. Heat and a bias voltage may be applied to the transfer rollers 76. A color image was obtained by repeating development and transfer of respective ink of cyan, magenta, yellow and black in the above-mentioned manner.

(Recording method 3)

A recording method 3 is a dry electrophotographic system in which electrostatic latent images corresponding to respective colors are sequentially formed on an electrostatic latent image carrier, those sequentially formed latent images are developed sequentially with dry toners of the respective colors, those sequentially developed images are electrostatically transferred one on one sequentially on transfer paper held on a transfer paper holding member constituted by a dielectric sheet, and thereafter this transfer paper where the transferred and superimposed toner images is separated from the transfer paper holding member, and fixed by heat and pressure. As a color image forming apparatus of the system, A-color 635 made by Fuji Xerox was used, so that solid, half-tone, and high-light 2 cm×2 cm patches of yellow, magenta, cyan, red, green, blue, black formed by a mixture of yellow, magenta, and cyan, the respective image area rates of which patches were 10, 20, 30, 40, 50, 60, 70, 80, 90 and 100% respectively, and about 100 μm width lines of yellow, magenta, cyan, red, green and blue were transferred and fixed on the above-mentioned respective recording paper samples so as to be recorded thereon.

Figure 8:
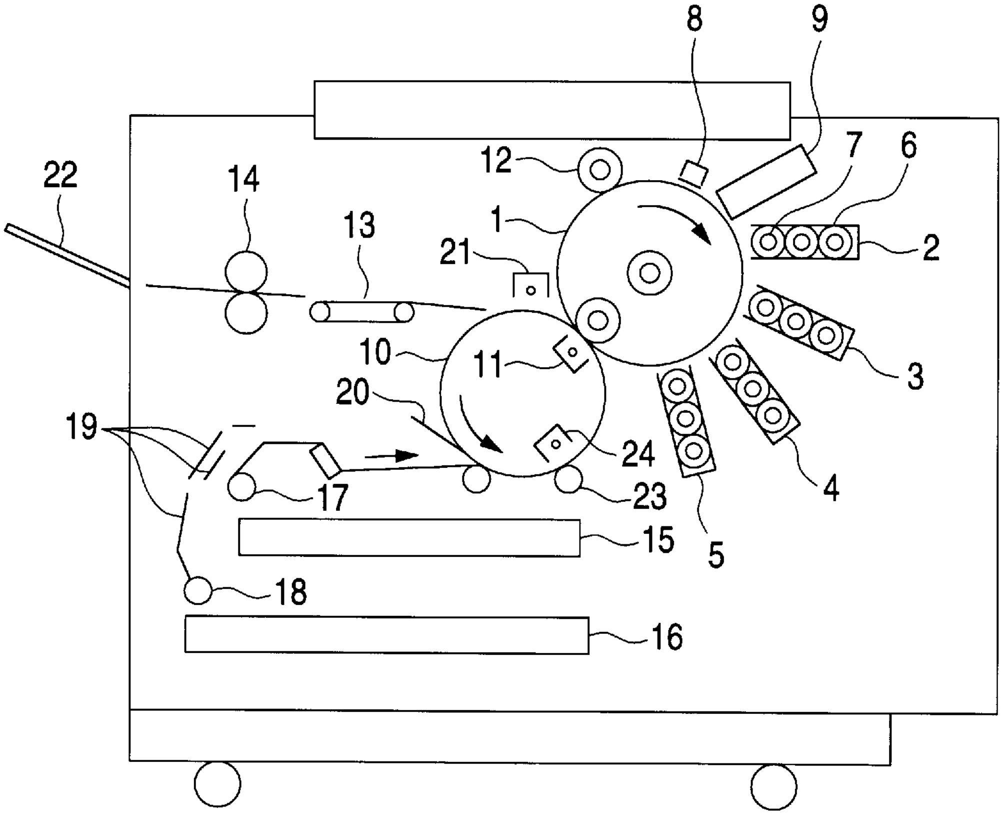
FIG. 8 is a typical view for explaining a mode of a recording method (dry electrophotographic system based on sequential transfer) according to the present invention.

The structure and operation of the apparatus employing the recording method 3 will be described specifically with reference to FIG. 8. This apparatus is roughly divided into a recording paper feeding system provided so as to extend from the lower side of the apparatus body to the almost center portion of the apparatus body, a latent image forming portion provided near a transfer drum 10 constituting the recording paper feeding system in the almost center portion of the apparatus body, and a developing device disposed near this latent image forming portion.

The recording paper feed system is constituted by feed trays 15 and 16 formed in the lower side of the apparatus body, feed rollers 17 and 18 disposed in an approximately just-above portions of those trays, paper feed guides 19 and 20 disposed near these feed rollers, a transfer drum 10 provided near the paper feed guide 20 rotatably in the direction of arrow, a recording paper separating electrifier 21 disposed near the outer circumference of the transfer drum 10, a transfer device 11 and an electrode 24 disposed on the inner circumferential side of the transfer drum 10, a contacting roller 22 contacting with the outer circumference of the transfer drum 10, a carrying device 13, a fixer 14 disposed near the carrying direction end side of the carrying device 13, and a detachable exhaust tray 22.

The latent image forming portion is disposed so that its outer circumference is in contact with the outer circumference of the transfer drum 10. The latent image forming portion has an electrostatic latent image holder (photosensitive drum) 1 rotatable in the direction of arrow, an electrifier 8 disposed near the outer circumference of the electrostatic latent image holder, a writing device 9 having an image exposing means such as a laser beam scanner for forming an electrostatic latent image onto the outer circumference of the electrostatic latent image holder and an image exposure reflecting means such as a polygon mirror, and a cleaning device 12.

The developing device is constituted by a developer holder 7 and a housing 6, and has a black developing machine 2, a magenta developing machine 3, a cyan developing machine 4 and a yellow developing machine 5 for making visible (developing) an electrified latent image formed on the outer circumference of the electrostatic latent image holder, in positions facing the outer circumference of the electrostatic latent image holder.

The recording method in the electrophotographic apparatus having the above-mentioned structure will be described in the case of a full color mode by way of example. When the electrostatic latent image holder 1 rotates in the direction of arrow, the surface of electrostatic latent image holder is electrified uniformly by the electrifier 8. Then, an electrostatic latent image is formed on the electrostatic latent image holder 1 through the wiring device 9 with laser light modulated by a black image signal of an original copy (not-shown), and the electrostatic latent image is developed by the black developing machine 2.

On the other hand, recording paper fed from the paper feed tray 15 or 16 through the paper feed roller 17 or 18 and the paper feed guide 19 or 20 is wound around the transfer drum electrostatically by the electrode 24 opposite to the contacting roller 23. The transfer drum 10 rotates in the direction of arrow synchronously with the electrostatic latent image holder, and the developed image developed by the black developing machine 2 is transferred by the transfer drum 10 in the portion where the outer circumference of the electrostatic latent image holder 1 and the outer circumference of the transfer drum 1 contact with each other. The transfer drum 10 continues to rotate as it is so as to be ready for transferring the next color.

The electrostatic latent image holder 1 is destaticized by a destaticizing electrifier (not-shown), cleaned by the cleaning device 12, electrified by the electrifier 8 again, and then receives latent image light as mentioned above in accordance with the next magenta image signal. An electrostatic latent image formed by reception of image exposure light in accordance with based the magenta image signal is developed by the magenta developing machine 3 so as to obtain a developed image. Succeedingly, such a process is also performed with respect to cyan and yellow, and when transfer of four colors is completed, a multi-color developed image formed on the recording paper is destaticized by the electrifier 21, fed to the fixer 14 by the paper feeding device 13, and fixed by heat and pressure. Thus, a series of full color image forming sequence is completed.

(Recording method 4)

By use of a color image forming apparatus of a dry electrophotographic system in which electrostatic latent images corresponding to respective colors and sequentially formed on an electrostatic latent image holder are developed sequentially with dry toners of the respective colors, the sequentially developed images electrostatically are primary-transferred one on one sequentially on an intermediate transfer body, and a multiplexed toner image transferred onto this intermediate transfer body is secondary-transferred onto recording paper electrostatically and by pressure, and fixed by heat and pressure, solid, half-tone, and high-light 2 cm×2 cm patches of yellow, magenta, cyan, red, green, blue, and black formed by a mixture of yellow, magenta, and cyan, the respective image area rates of the patches being 10, 20, 30, 40, 50, 60, 70, 80, 90 and 100%, and about 100 $\mu$m width lines of yellow, magenta, cyan, red, green and blue were transferred and fixed onto the above-mentioned respective recording paper samples so as to be recorded thereon.

Figure 9:
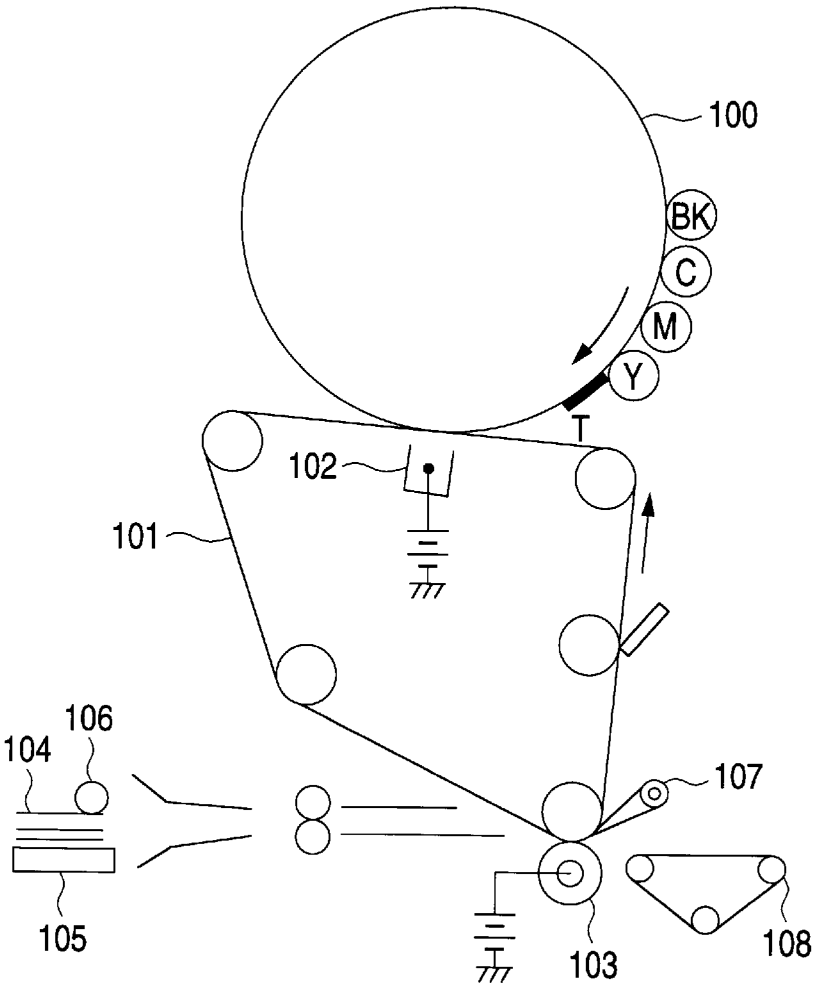
FIG. 9 is a typical view for explaining a mode of a recording method (dry electrophotographic recording system based on collective transfer using an intermediate transfer body) according to the present invention.

This recording method 4 will be described in detail with reference to FIG. 9. A toner image T is formed on the surface of a photosensitive drum 100 which is an electrostatic latent image carrier, by not-shown means for executing an electrophotographic process, such as a primary electrifier, an image exposure means, a developing machine, etc. The toner image T formed on the surface of the photosensitive drum 100 is fed to a primary transfer position as the photosensitive drum 100 rotates. Discharge is performed, in the primary transfer position, to an endless belt-like intermediate transfer body 101 laid over a plurality of rollers and disposed in contact with or near the surface of the photosensitive drum 100. That is, a primary transfer corona discharger 102 disposed on the back side of the primary transfer position applies a voltage with a polarity reverse to the toner electrifying polarity on the photosensitive drum 100 so as to discharge to the intermediate transfer body 101. Next, the image is transferred (secondary-transferred) onto recording paper fed from a feed roller (that is, roller for feeding transfer paper 104 put on a paper feed tray 105 toward the intermediate transfer body 101, 106, by a secondary-transfer bias roll (that is, a roll which holds the recording paper 104 fed from the paper feed tray 105 between the intermediate transfer body 101 and the roll itself, and applies a transfer voltage of a polarity reverse to the toner electrified polarity) 103. The recording paper is separated in a separation position by a separating nail 107 which is disposed such that its top end can contact with and separate from the intermediate transfer body 101. The separated recording paper is fed to a not-shown fixing device by a carrying belt 108. The recording paper where the toner image is transferred is fed to a not-shown hot-press roller fixation device by means of this carrying belt, and the toner image is fused and fixed. Thus, image recording is completed.

Also in the case where heat and pressure were given to a roll for applying heat and pressure and a roll opposite to the first-mentioned roll in stead of the secondary-transfer bias roll 103, the result was similar to that the secondary-transfer bias roll shown in Table 4 to 63 was similar.

(Recording method 5)

As a heat transfer recording method, solid, half-tone, and high-light 2 cm×2 cm patches of yellow, magenta, cyan, red, green and blue were recorded on the above-mentioned respective recording paper samples by use of MD-2000S (made by Alps Electric Co., Ltd.). In addition, one-dot and four-dot width lines of yellow, magenta, cyan, red, green and blue were recorded on the above-mentioned respective recording paper samples.

Figure 10:
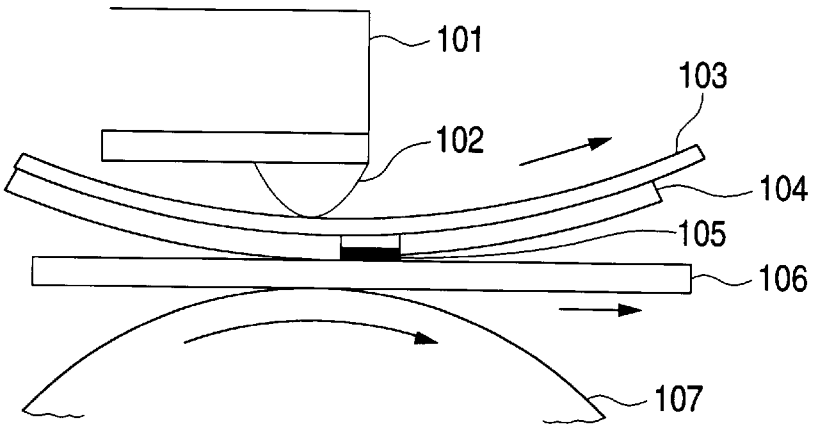
FIG. 10 is a typical view for explaining a mode of a recording method (hot melt transfer recording system) according to the present invention.

The recording method 5 will be described specifically with reference to FIG. 10. A current was applied to a thermal head 101 in accordance with an image signal so as to heat a heating element 102. An ink layer 104 of an ink ribbon 103 was melted, and transferred to recording paper 106 held on a platen 107 to thereby form a transferred ink layer 105.

By this method, a color image was formed by sequentially transferring respective ink of cyan, magenta, yellow and black onto the recording paper.

Image Recording Evaluation

Color images were recorded onto the respective recording paper samples shown in Tables 1 to 4 by use of the recording method 1, the recording method 2, the recording method 3 and the recording method 4. The results were shown in Tables 5 to 7.

TABLE 5

| recording paper sample | A-1 | | | | A-2 | | | | | A-3 | | | | A-4 | | | |
|---|---|---|---|---|---|---|---|---|---|---|---|---|---|---|---|---|---|
| recording method | 1 | 2 | 3 | 4 | 1 | 2 | 3 | 4 | 5 | 1 | 2 | 3 | 4 | 1 | 2 | 3 | 4 |
| sharpness of lines | B | B | B | B | A | A | A | A | A | A | A | A | A | A | A | A | A |
| color identification | B | B | • | • | A | A | • | • | • | A | A | • | • | A | A | • | • |
| bleeding between colors | B | B | • | • | A | A | • | • | • | A | A | • | • | A | A | • | • |
| granularity | • | • | B | B | • | A | A | A | • | • | A | A | • | A | A | | |
| unevenness of images | B | A | • | • | A | A | A | • | • | A | A | • | • | A | A | | |
| curl and roughness | A | A | A | A | A | A | B | B | A | A | A | B | B | B | B | C | C |
| total | B | B | B | B | A | A | A | A | A | A | A | A | A | A | A | B | B |

| recording paper sample | B-1 | | | | C-1 | | | | C-2 | | | | D-1 | | | |
|---|---|---|---|---|---|---|---|---|---|---|---|---|---|---|---|---|
| recording method | 1 | 2 | 3 | 4 | 1 | 2 | 3 | 4 | 1 | 2 | 3 | 4 | 1 | 2 | 3 | 4 |

TABLE 5-continued

| | | | | | | | | | | | | | | | | |
|---|---|---|---|---|---|---|---|---|---|---|---|---|---|---|---|---|
| sharpness of lines | B | B | A | A | A | A | A | A | A | A | A | A | C | C | B | B |
| color identification | B | B | • | • | A | A | • | A | A | • | • | C | C | | | |
| bleeding between colors | B | B | • | • | A | A | • | • | A | A | • | • | C | C | | |
| granularity | • | • | A | A | • | • | A | A | • | A | A | • | • | A | A | |
| mottles of images | • | • | A | A | • | • | A | A | • | A | A | • | • | A | A | |
| curl and roughness | A | A | B | B | A | A | B | B | A | A | B | B | A | A | B | B |
| total | B | B | A | A | A | A | A | A | A | A | A | A | C | C A | A | |

| recording paper sample | D-2 | | | | D-3 | | | | D-4 | | | | D-5 | | | | |
|---|---|---|---|---|---|---|---|---|---|---|---|---|---|---|---|---|---|
| recording method | 1 | 2 | 3 | 4 | 1 | 2 | 3 | 4 | 1 | 2 | 3 | 4 | 1 | 2 | 3 | 4 | 5 |
| sharpness of lines | B | B | A | A | B | B | B | B | C | C | C | C | D | D | D | D | C |
| color identification | B | B | • | • | B | B | • | • | C | C | • | • | D | D | • | • | • |
| bleeding between colors | B | B | • | • | B | B | • | • | C | C | • | • | D | D | • | • | • |
| granularity | • | • | A | A | • | • | A | A | • | • | B | B | • | • | C | C | D |
| unevenness of images | • | • | A | A | • | • | B | B | • | • | • | • | D | D | C | | |
| curl and roughness | A | A | B | B | A | A | B | B | B | B | B | B | C | C | D | D | B |
| total | B | B | A | A | B | B | A | A | C | C | C | C | D | D | D | D | D |

| recording paper sample | E-1 | | | | F-1 | | | |
|---|---|---|---|---|---|---|---|---|
| recording method | 1 | 2 | 3 | 4 | 1 | 2 | 3 | 4 |
| sharpness of lines | D | D | C | C | C | C | B | B |
| color identification | D | D | • | • | C | C | • | • |
| bleeding between colors | D | D | • | • | C | C | • | • |
| granularity | • | • | B | B | • | • | B | B |
| mottles of images | • | • | C | C | • | • | B | B |
| curl and roughnes s | D | D | D | D | B | B | B | B |
| total | D | D | D | D | C | C | B | B |

TABLE 6

| recording paper sample | G-1 | | | | G-2 | | | | G-3 | | | |
|---|---|---|---|---|---|---|---|---|---|---|---|---|
| recording method | 1 | 2 | 3 | 4 | 1 | 2 | 3 | 4 | 1 | 2 | 3 | 4 |
| sharpness of lines | A | A | A | A | B | B | A | A | C | C | B | B |
| color identification | A | A | • | • | A | A | • | • | B | B | • | • |
| bleeding between colors | A | A | • | • | B | B | • | • | B | B | • | • |
| granularity | • | • | A | A | • | • | A | A | • | • | B | B |
| mottles of images | • | • | A | A | • | • | A | A | • | • | B | B |
| curl and roughness | A | A | B | B | A | A | B | B | A | A | B | B |
| total | A | A | A | A | B | B | A | A | C | C | B | B |

TABLE 7

| recording paper sample | H-1 | | | | | H-2 | | | | H-3 | | | |
|---|---|---|---|---|---|---|---|---|---|---|---|---|---|
| recording method | 1 | 2 | 3 | 4 | 5 | 1 | 2 | 3 | 4 | 1 | 2 | 3 | 4 |
| sharpness of lines | A | A | A | A | A | A | A | A | A | D | D | D | D |
| color identification | A | A | • | • | • | A | A | • | • | D | D | • | • |
| bleeding between colors | A | A | • | • | • | A | A | • | • | D | D | • | • |
| granularity | • | • | A | A | A | • | • | A | A | • | • | C | C |
| mottles of images | • | • | A | A | A | • | • | A | A | • | • | D | D |
| curl and roughness | A | A | A | A | A | A | A | B | B | C | C D | D | |
| total | A | A | A | A | A | A | A | A | A | D | D D | D | |

Scales of image quality, curl and total evaluation of images formed on the recording paper samples by those methods are shown as follows.

A: excellent

B: good

C: allowable

D: not allowable (Effect by Mixture of Hydrophilic Fibers and Hydrophobic Fibers)

In the recording paper samples D-5, E-1 and H-3, hydrophobic fibers are not mixed in their surface layers. In the recording paper samples other than those mentioned above, samples D-5, E-1 and H-3, hydrophilic fibers and hydrophobic fibers are mixed in their surface layers. As a result, in the latter samples, the image quality and curl/roughness reach allowable levels in any of the recording methods 1, 2, 3 and 4 while in the samples D-5, E-1, H-3, they do not reach allowable levels in some of the recording methods 1, 2, 3 and 4.

(Effect of Cellulose Fibers used as Hydrophilic Fibers)

As is apparent from the comparison between the recording paper samples B-1 and A-2, images by a water-based liquids are superior particularly in sharpness of lines, coloring property and inter-color bleeding by the effect of use of cellulose fibers as the hydrophilic fibers forming the surface layer.

(Influence of Length and Width of Fibers and Influence of Mixture Ratio of Hydrophilic Fibers to Hydrophobic Fibers)

Among the recording paper samples A-1 and A-2, A-3 and A-4, the freeness of cellulose fibers (LBKP) which are hydrophilic fibers were changed, and the influence when the fibers were made very fine was observed. The samples A-2, A-3 and A-4 where the Canadian standard freeness is 300 ml or less are superior in sharpness of lines, coloring property, granularity, and image mottles in any recording method. In the sample A-4 where the Canadian standard freeness is 150 ml, curl and roughness are present particularly in a dry electrophotographic recording system, but they are in a allowable level.

As is apparent from the comparison between the recording paper samples F-1 and A-2, the sharpness of lines, coloring property, granularity and image mottles are more superior if the length and width of hydrophobic fibers and made short and small.

In addition, as is understood from the comparison between the recording paper samples D-1 and D-2, D-3 and D-4 where the mixture ratio of hydrophobic fibers is changed variously, it will do to set the mixture ratio of hydrophobic fibers in a range of from 10 weight units to 100 weight units relative to hydrophilic fibers 100 weight units. The images are superior both in image quality and curl/roughness in any of the recording methods 1, 2, 3 and 4.

(Influence of the Sort of Hydrophobic Fibers)

The influence of the sort of hydrophobic fibers was confirmed on the recording paper samples A-2, C-1 and C-2. The image quality is superior regardless of the sort of hydrophobic fibers in any of recording methods.

(Effect of Multi-layer Paper and Influence of High Freeness of Internal Layer)

By the comparison between the recording paper samples A-2, H-1 and H-2, images are more superior in curl and roughness by the effect of making the freeness of the internal layer high in multi-layer (three-layer) paper.

In addition, as shown in the sample H-3, even if hydrophilic fibers which are large in Canadian standard freeness are used in the internal layer, images become poor in image quality and curl/roughness, and do not reach the allowable level in the case where the front and back surface layers consist of only hydrophilic fibers which are small in Canadian standard freeness.

(Influence of Fiber Orientation Ratio)

In the recording paper samples G1, G2 and G3, the fiber orientation ratio was changed on the basis of the sample A-2. In the samples where the fiber orientation ratio is 1.40 or less, images are more superior in the sharpness of lines, coloring property, inter-color bleeding, granularity and image mottles.

(Compatibility between Water-based Liquid Recording and Dry Electrophotographic Recording)

In the recording paper samples other than the samples D-5, E-1 and H-3 in which the surface layer consists of only hydrophilic fibers, image quality and curl/roughness reach their allowable levels in either of water-based liquid recording and dry electrophotographic recording. Particularly, from the point of view of compatibility, the samples A-2, A-3, C-1, C-2, G-1, H-1 and H-2 are superior, and the sample H-1 is more superior.

As has been described above, the recording paper and the recording method according to the present invention are superior in coloring property and inter-color bleeding preventing property in recording with a water-based liquid containing dye, pigment or coloring fine particles, and superior in granularity and image mottle preventing property in recording in a dry electrophotographic system. The recording paper and recording method are superior in sharpness of lines and shape deformation preventing property such as curl, roughness and so on preventing also in color recording with a water-based liquid or in color recording in a dry electrophotographic system. In addition, they are superior in sharpness of lines, granularity and image-mottle prevention also in recording in a heat transfer system. Therefore, the recording paper according to the present invention is suitable for various recording, and can be used for various recording methods in common.

What is claimed is:

1. Recording paper in which at least one of opposite surfaces of said recording paper consists essentially of a mixture of hydrophilic fibers and hydrophobic fibers, and said hydrophilic fibers and said hydrophobic fibers slide on each other to give said recording paper a cushioning property.

2. Recording paper according to claim 1, wherein said hydrophilic fibers are of Canadian Standard freeness not less than 50 ml and not more than 300 ml, and said hydrophobic fibers are not more than 2 denier in thickness and not more than 4 mm in length.

3. Recording paper according to claim 1, wherein said hydrophilic fibers are cellulose fibers.

4. Recording paper according to claim 1, wherein the fiber orientation ratio according to an ultrasonic wave propagation method in said surface portion containing the mixture of the hydrophilic fibers and hydrophobic fibers is not less than 1.0 and not more than 1.4.

5. Recording paper according to claim 1, wherein the content of said hydrophobic fibers is not less than 10 weight units and not more than 100 weight units when the content of said hydrophilic fibers is defined as 100 weight units.

6. Recording paper including at least first and second layers, wherein said first layer consists essentially of a mixture of hydrophilic fibers and hydrophobic fibers, said hydrophilic fibers and said hydrophobic fibers slide on each other to give said recording paper a cushioning property, and said second layer contains cellulose fibers.

7. Recording paper according to claim 6, wherein said hydrophilic fibers are cellulose fibers.

8. Recording paper according to claim 6, wherein the fiber orientation ratio according to an ultrasonic wave propagation method in said first layer is not less than 1.0 and not more than 1.4.

9. Recording paper according to claim 6, wherein the content of said hydrophobic fibers is not less than 10 weight units and not more than 100 weight units when the content of said hydrophilic fibers is 100 weight units.

10. Recording paper according to claim 6, wherein said second layer contains cellulose fibers, said cellulose fibers being of Canadian Standard freeness not less than 400 ml.

11. Recording paper including a first surface layer and a second surface layer provided on the opposite side to said first layer, and at least one third layer provided between said first and second surface layers, wherein at least one of said first and second surface layers of said recording paper consists essentially of a mixture of hydrophilic fibers and hydrophobic fibers, said hydrophilic fibers and said hydrophobic fibers slide on each other to give said recording paper a cushioning property, and said at least one third layer contains cellulose fibers.

12. Recording paper according to claim 11, wherein said hydrophilic fibers are cellulose fibers.

13. Recording paper according to claim 11, wherein the fiber orientation ratio according to an ultrasonic wave propagation method in said layer containing the mixture of the hydrophilic fibers and hydrophobic fibers is not less than 1.0 and not more than 1.4.

14. Recording paper according to claim 11, wherein the content of said hydrophobic fibers is not less than 10 weight units and not more than 100 weight units when the content of said hydrophilic fibers is 100 weight units.

15. Recording paper according to claim 11, wherein both of said first and second surface layers essentially consists of the mixture of hydrophilic fibers and hydrophobic fibers.

16. Recording paper according to claim 11, wherein said hydrophilic fibers are of Canadian Standard freeness not less than 50 ml and not more than 300 ml, and said hydrophobic fibers are not more than 2 denier in thickness and not more than 4 mm in length.

17. Recording paper according to claim 15, wherein said hydrophilic fibers are of Canadian Standard freeness not less than 50 ml and not more than 300 ml, and said hydrophobic fibers are not more than 2 denier in thickness and not more than 4 mm in length.

18. A recording method for recording on recording paper, wherein at least one of opposite surface portions of said recording paper contains a mixture of hydrophilic fibers and hydrophobic fibers as main raw material, said hydrophilic fibers and said hydrophobic fibers slide on each other to provide said recording paper with a cushioning property, and recording is performed, with water-based ink containing color material such as dye, pigment, or coloring fine particles, on said surface portion containing the mixture of hydrophilic fibers and hydrophobic fibers as main raw material.

19. A recording method according to claim 18, wherein:

said recording paper includes at least first and second layers;

said first layer contains the mixture of hydrophilic fibers and hydrophobic fibers as main raw material;

said second layer contains cellulose fibers as main raw material; and recording is performed on said first layer with water-based ink containing color material such as dye, pigment, or coloring fine particles.

20. A recording method according to claim 18, wherein:

said recording paper includes a first surface layer, a second surface layer provided on the opposite side to said first layer, and at least one other layer provided between said first and second surface layers;

at least one of said first and second surface layers of said recording paper contains the mixture of hydrophilic fibers and hydrophobic fibers as main raw material;

said at least one other layer contains cellulose fibers as main raw material; and recording is performed, with water-based ink containing color material such as dye, pigment, or coloring fine particles, on said layer containing the mixture of hydrophilic fibers and hydrophobic fibers as main raw material.

21. A recording method for recording on recording paper, wherein at least one of opposite surface portions of said recording paper contains a mixture of hydrophilic fibers and hydrophobic fibers as main raw material, said hydrophilic fibers and said hydrophobic fibers slide on each other to provide said recording paper with a cushioning property, and recording is performed with powder toner on said surface portion containing the mixture of hydrophilic fibers and hydrophobic fibers as main raw material.

22. A recording method according to claim 21, wherein:

said recording paper includes at least first layer and second layers;

said first layer contains the mixture of hydrophilic fibers and hydrophobic fibers as main raw material;

said second layer contains cellulose fibers as main raw material; and recording is performed on said first layer with powder toner.

23. A recording method according to claim 21, wherein:

said recording paper includes a first surface layer, a second surface layer provided on the opposite side to said first layer, and at least one other layer provided between said first and second surface layers;

at least one of said first and second surface layers of said recording paper contains the mixture of hydrophilic fibers and hydrophobic fibers as main raw material;

said at least one other layer contains cellulose fibers as main raw material; and recording is performed with powder toner on said layer containing the mixture of hydrophilic fibers and hydrophobic fibers as main raw material.

24. Recording method for recording on recording paper, wherein at least one of opposite surface portions of said recording paper contains a mixture of hydrophilic fibers and hydrophobic fibers as main raw material, said hydrophilic fibers and said hydrophobic fibers slide on each other to provide said recording paper with a cushioning property, and recording is performed, with hot-melt ink containing coloring fine particles, on said surface portion containing the mixture of hydrophilic fibers and hydrophobic fibers as main raw material.

25. Recording method according to claim 24, wherein:

said recording paper includes at least first and second layers;

said first layer contains the mixture of hydrophilic fibers and hydrophobic fibers as main raw material;

said second layer contains cellulose fibers as main raw material; and recording is performed on said first layer with hot-melt ink containing coloring fine particles.

26. Recording method according to claim 24, wherein:

said recording paper includes a first surface layer, a second surface layer provided on the opposite side to said first layer, and at least one other layer provided between said first and second surface layers;

at least one of said first and second surface layers of said recording paper contains the mixture of hydrophilic fibers and hydrophobic fibers as main raw material;

said at least one other layer contains cellulose fibers as main raw material; and recording is performed, with hot-melt ink containing coloring fine particles, on said layer containing the mixture of hydrophilic fibers and hydrophobic fibers as main raw material.

27. Recording paper according to claim 1, wherein said hydrophilic fibers slide on each other.

28. A recording method according to claim 18, wherein said recording paper includes at least first and second layers, said first layer essentially consists of a mixture of said hydrophilic fibers and said hydrophobic fibers, and said second layer contains cellulose fibers.

29. A recording method according to claim 21, wherein said recording paper includes at least first and second layers, said first layer essentially consists of a mixture of said hydrophilic fibers and said hydrophobic fibers, and said second layer contains cellulose fibers.

30. A recording method according to claim 24, wherein said recording paper includes at least first and second layers, said first layer essentially consists of a mixture of said hydrophilic fibers and said hydrophobic fibers, and said second layer contains cellulose fibers.

* * * * *